US011012882B2

(12) United States Patent
Yum et al.

(10) Patent No.: US 11,012,882 B2
(45) Date of Patent: May 18, 2021

(54) METHOD FOR INTERFERENCE MEASUREMENT IN WIRELESS COMMUNICATION SYSTEM AND DEVICE THEREFOR

(71) Applicant: LG Electronics Inc., Seoul (KR)

(72) Inventors: Kunil Yum, Seoul (KR); Jiwon Kang, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 16/337,716

(22) PCT Filed: Sep. 27, 2017

(86) PCT No.: PCT/KR2017/010690
§ 371 (c)(1),
(2) Date: Mar. 28, 2019

(87) PCT Pub. No.: WO2018/062833
PCT Pub. Date: Apr. 5, 2018

(65) Prior Publication Data
US 2020/0045572 A1    Feb. 6, 2020

Related U.S. Application Data

(60) Provisional application No. 62/401,159, filed on Sep. 28, 2016.

(51) Int. Cl.
*H04W 24/10* (2009.01)
*H04B 17/336* (2015.01)
(Continued)

(52) U.S. Cl.
CPC .......... *H04W 24/10* (2013.01); *H04B 17/336* (2015.01); *H04W 52/243* (2013.01); *H04W 72/046* (2013.01); *H04W 72/0446* (2013.01)

(58) Field of Classification Search
CPC ............... H04W 24/10; H04W 72/046; H04W 72/0446; H04W 52/243; H04B 17/336; H04B 17/345
See application file for complete search history.

(56) References Cited

U.S. PATENT DOCUMENTS

2010/0279619 A1    11/2010  Yeh et al.
2015/0270917 A1*   9/2015   Roman .................. H04J 11/005
                                                    370/329
(Continued)

FOREIGN PATENT DOCUMENTS

| WO | WO2014171753 | 10/2010 |
| WO | WO2016086144 | 6/2016 |
| WO | WO2016089122 | 6/2016 |

OTHER PUBLICATIONS

Huawei, HiSilicon, "Interference Measurement Mechanism for Link Adaptation in NR," R1-167225, 3GPP TSG RAN WG1 Meeting #86, Gothenburg, Sweden, Aug. 22-26, 2016, 4 pages.
(Continued)

*Primary Examiner* — Habte Mered
(74) *Attorney, Agent, or Firm* — Fish & Richardson P.C.

(57) ABSTRACT

An embodiment of the present disclosure relates to a method for interference measurement in a wireless communication system, and the method is performed by a base station and comprises the steps of: transmitting a resource setting for interference measurement, which is acquired from a neighboring interference base station, to a plurality of terminals, wherein the resource setting includes information on a predetermined beam used in each interference measurement resource; and receiving, from the plurality of terminals, a measurement result obtained by measurement in each interference measurement resource within the resource setting, wherein the measurement result includes indices of N beams in which a highest interference power is measured or indices
(Continued)

(a)

(b)

of N interference measurement resources in which a highest interference power is measured, and N may be an integer of one or greater.

16 Claims, 10 Drawing Sheets

(51) Int. Cl.
*H04W 72/04* (2009.01)
*H04W 52/24* (2009.01)

(56) References Cited

U.S. PATENT DOCUMENTS

| | | | |
|---|---|---|---|
| 2015/0341942 A1* | 11/2015 | Lee | H04W 72/082 |
| | | | 370/252 |
| 2016/0277942 A1* | 9/2016 | Chande | H04W 24/02 |
| 2016/0277954 A1* | 9/2016 | Frenne | H04L 5/0057 |
| 2017/0105223 A1* | 4/2017 | Zhang | H04W 16/10 |
| 2018/0331747 A1* | 11/2018 | Kakishima | H04B 7/0639 |
| 2018/0351621 A1* | 12/2018 | Wei | H04B 7/0478 |
| 2018/0351668 A1* | 12/2018 | Kim | H04J 11/0053 |

OTHER PUBLICATIONS

PCT International Search Report and Written Opinion in International Application No. PCT/KR2017/010690, dated Dec. 27, 2017, 24 pages (with English translation).

\* cited by examiner (a)

(b)

METHOD FOR INTERFERENCE MEASUREMENT IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2017/010690, filed on Sep. 27, 2017, which claims the benefit of U.S. Provisional Application No. 62/401,159, filed on Sep. 28, 2016. The disclosures of the prior applications are incorporated by reference in their entirety.

TECHNICAL FIELD

The present disclosure relates to a wireless communication system, and more particularly, to a method and apparatus for measuring interference.

BACKGROUND ART

As more and more communication devices require larger communication capacities, there is a need for enhanced mobile broadband communication (eMBB), compared to legacy radio access technologies (RATs). In addition, massive machine type communications (mMTC) which connects multiple devices and objects to one another to provide various services at any time in any place is one of main issues to be considered for future-generation communications. Besides, a communication system design which considers services sensitive to reliability and latency is under discussion. As such, the introduction of a future-generation RAT in consideration of eMBB, mMTC, ultra-reliable and low-latency communication (URLLC), and so on is under discussion. In the present disclosure, this technology is referred to as New RAT, for the convenience's sake.

DISCLOSURE

Technical Problem

The present disclosure is intended to propose a method for measuring interference. More particularly, the present disclosure is intended to propose a method for measuring interference.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method for interference measurement in a wireless communication system, performed by a base station (BS) includes transmitting a resource configuration for interference measurement, acquired from a neighbor interference BS to a plurality of user equipments (UEs), the resource configuration including information about a predetermined beam used in each interference measurement resource, and receiving, from the plurality of UEs, results of measurement in each interference measurement resource of the resource configuration. The measurement results may include indexes of N beams in which highest interference power has been measured or indexes of N interference measurement resources in which the highest interference power has been measured, and N may be an integer equal to or larger than 1.

Additionally or alternatively, the method may further include deriving an interference beam list causing most interference to the plurality of UEs from the received measurement results, and transmitting the interference beam list to the neighbor interference BS.

Additionally or alternatively, a weight may be used for each beam or each interference measurement resource to derive the interference beam list.

Additionally or alternatively, a beam included in the interference beam list may be used for downlink transmission only in a specific subframe set by the neighbor interference BS.

Additionally or alternatively, a length of the specific subframe set may be set in inverse proportion to a relative magnitude of an interference measurement result of the beam included in the interference beam list.

Additionally or alternatively, the method may further include receiving, from the neighbor interference BS, a neighbor interference beam list derived according to measurement results of UEs served by the neighbor interference BS.

Additionally or alternatively, the resource configuration may indicate use of a different beam on a subframe basis in a specific interference measurement resource included in the resource configuration.

Additionally or alternatively, the resource configuration may indicate use of a different beam on a resource block basis in a specific interference measurement resource included in the resource configuration.

Additionally or alternatively, the measurement results may include an index of a beam in which interference power higher than a predetermined threshold has been measured, or an index of an interference measurement resource in which interference power higher than the predetermined threshold has been measured.

Additionally or alternatively, the resource configuration may indicate semi-persistent interference measurement, and activation and deactivation of the resource configuration may be indicated by dynamic signaling.

Additionally or alternatively, interference measurement results may not be averaged in a period for the semi-persistent interference measurement.

According to another aspect of the present disclosure, a method for interference measurement in a wireless communication system, performed by a UE, includes receiving a resource configuration for interference measurement, acquired from a neighbor interference BS from a serving BS, the resource configuration including information about a predetermined beam used in each interference measurement resource, and measuring interference in each interference measurement resource of the resource configuration, and reporting measurement results to the serving BS. The measurement results may include indexes of N beams in which highest interference power has been measured or indexes of N interference measurement resources in which the highest interference power has been measured, and N may be an integer equal to or larger than 1.

Additionally or alternatively, the resource configuration may indicate use of a different beam on a subframe basis in a specific interference measurement resource included in the resource configuration.

Additionally or alternatively, the resource configuration may indicate use of a different beam on a resource block basis in a specific interference measurement resource included in the resource configuration.

Additionally or alternatively, the measurement results may include an index of a beam in which interference power higher than a predetermined threshold has been measured, or an index of an interference measurement resource in which interference power higher than the predetermined threshold has been measured.

Additionally or alternatively, the resource configuration may indicate semi-persistent interference measurement, and activation and deactivation of the resource configuration may be indicated by dynamic signaling.

Additionally or alternatively, interference measurement results may not be averaged in a period for the semi-persistent interference measurement.

According to another aspect of the present disclosure, a BS for performing interference measurement in a wireless communication system may include a transmitter and receiver, and a processor configured to control the transmitter and receiver. The processor may be configured to transmit a resource configuration for interference measurement, acquired from a neighbor interference BS to a plurality of UEs, the resource configuration including information about a predetermined beam used in each interference measurement resource, and to receive, from the plurality of UEs, results of measurement in each interference measurement resource of the resource configuration. The measurement results may include indexes of N beams in which highest interference power has been measured or indexes of N interference measurement resources in which the highest interference power has been measured, and N may be an integer equal to or larger than 1.

The aforementioned solutions are just a part of embodiments of the present disclosure. Various embodiments to which technical characteristics of the present disclosure are reflected can be drawn and understood based on detail explanation on the present disclosure to be described in the following by those skilled in the corresponding technical field.

Advantageous Effects

According to the embodiments of the present disclosure, interference may efficiently be measured. [25] It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

MODE FOR CARRYING OUT THE INVENTION

Figure 1:
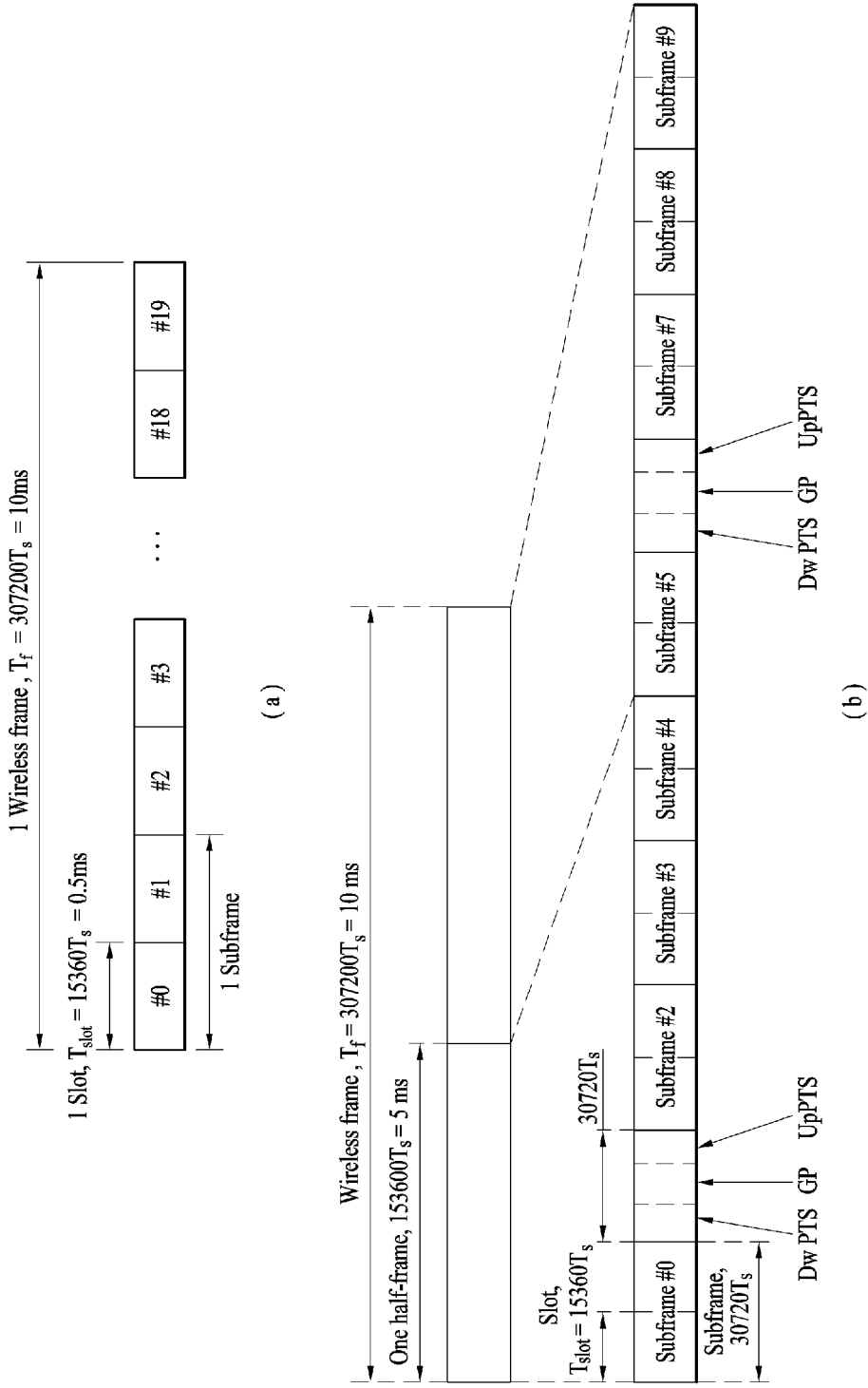
FIG. 1 illustrates an exemplary radio frame structure in a wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

Figure 2:
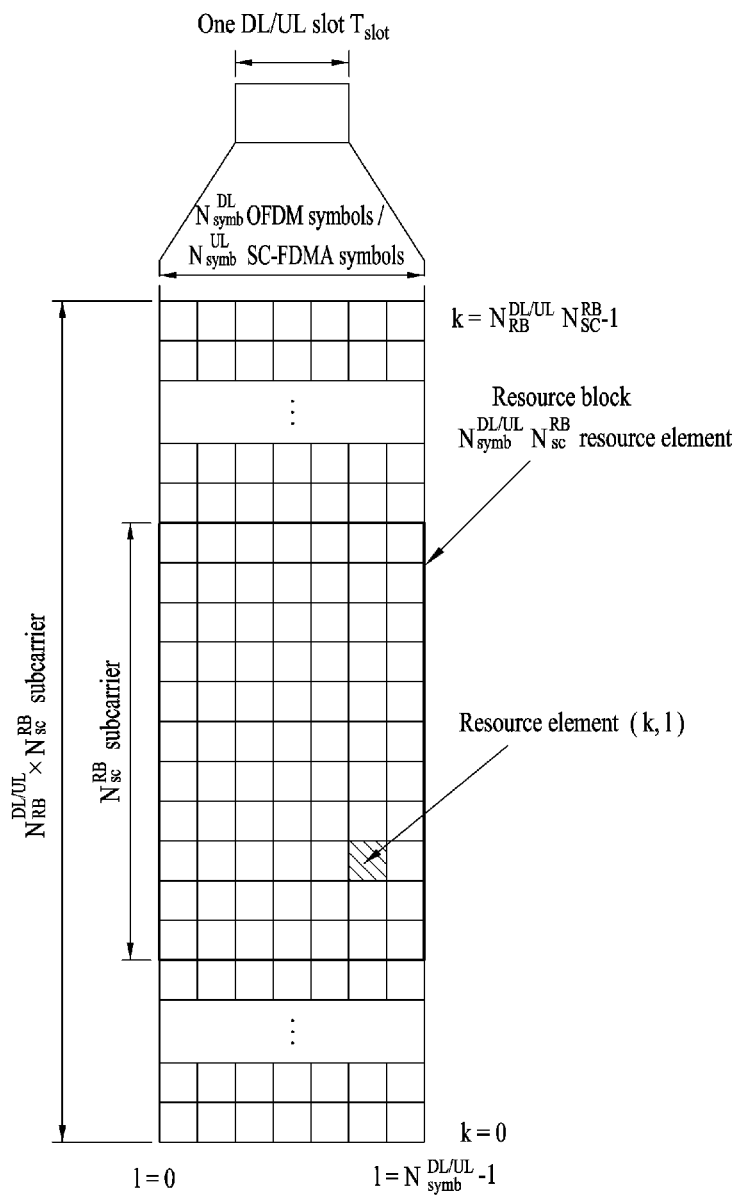
FIG. 2 illustrates an exemplary downlink/uplink (DL/UL) slot structure in the wireless communication system.

FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | Normal cyclic prefix in uplink | Extended cyclic prefix in uplink | | DwPTS | Normal cyclic prefix in uplink | Extended cyclic prefix in uplink |
| 0 | 6592 · $T_s$ | 2192 · $T_s$ | 2560 · $T_s$ | | 7680 · $T_s$ | 2192 · $T_s$ | 2560 · $T_s$ |
| 1 | 19760 · $T_s$ | | | | 20480 · $T_s$ | | |
| 2 | 21952 · $T_s$ | | | | 23040 · $T_s$ | | |
| 3 | 24144 · $T_s$ | | | | 25600 · $T_s$ | | |
| 4 | 26336 · $T_s$ | | | | 7680 · $T_s$ | 4384 · $T_s$ | 5120 · $T_s$ |
| 5 | 6592 · $T_s$ | 4384 · $T_s$ | 5120 · $T_s$ | | 20480 · $T_s$ | | |
| 6 | 19760 · $T_s$ | | | | 23040 · $T_s$ | | |
| 7 | 21952 · $T_s$ | | | | 12800 · $T_s$ | | |
| 8 | 24144 · $T_s$ | | | | — | — | — |
| 9 | 13168 · $T_s$ | | | | — | — | — |

FIG. 2 illustrates an exemplary downlink/uplink slot structure in a wireless communication system. Particularly, 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
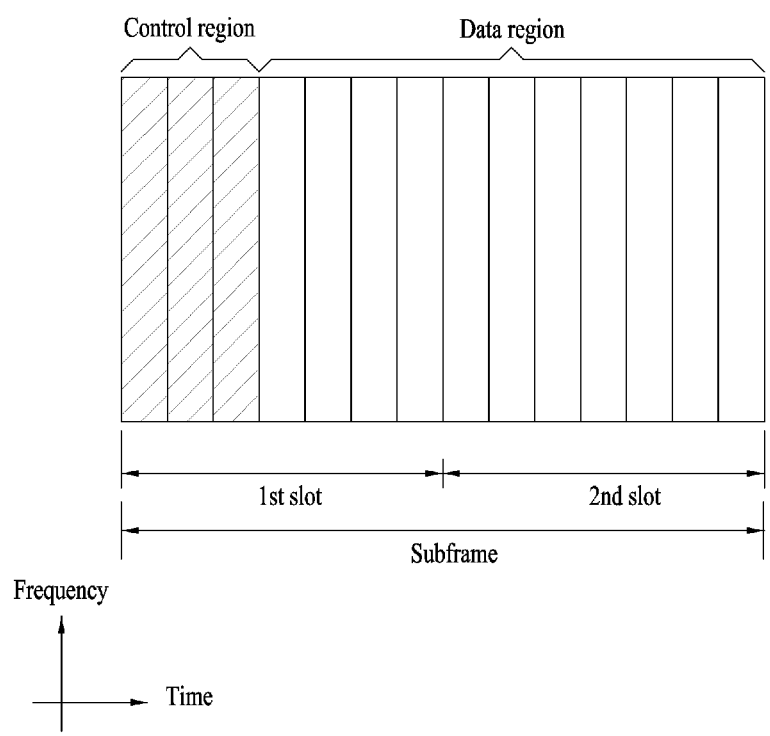
FIG. 3 illustrates an exemplary DL subframe structure in a $3^{rd}$ generation partnership project long term evolution/long term evolution-advanced (3GPP LTE/LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
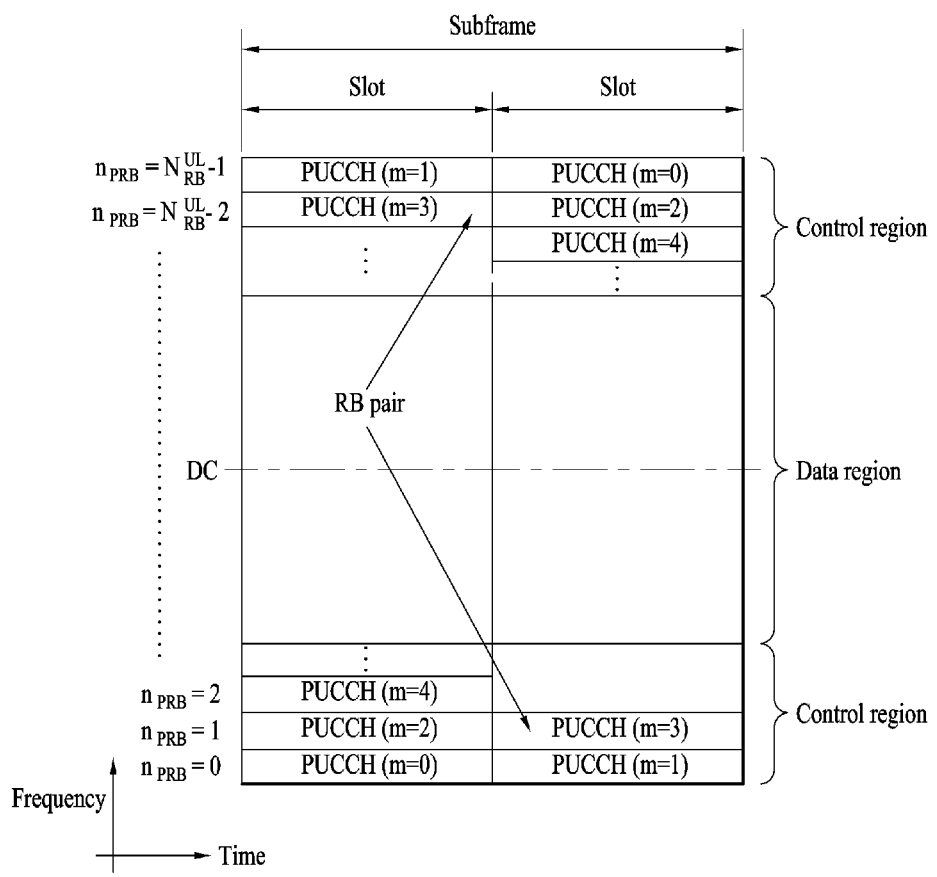
FIG. 4 illustrates an exemplary UL subframe structure in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MB SFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, it is defined that a UE reports CSI to a BS. CSI generically refers to information representing the quality of a radio channel (or link) established between a UE and an antenna port. For example, the CSI corresponds to a rank indicator (RI), a precoding matrix indicator (PMI), a channel quality indicator (CQI), and so on. The RI represents information about the rank of a channel, which means the number of streams that the UE receives in the same time-frequency resources. Since the RI depends on the long-term fading of the channel, the UE generally feeds back the RI to the BS in a longer period. The PMI is a value reflecting a channel space property, representing a UE-preferred precoding index based on a metric such as an SINR or the like. The CQI represents a channel strength, generally meaning a reception SINR that may be obtained when the BS uses a PMI.

Based on the measurement of the radio channel, the UE calculates a preferred PMI and RI which may offer an optimum or highest transmission rate, when used in the BS in a current channel state, and feeds back the calculated PMI and RI to the BS. The CQI refers to a modulation and coding scheme which provides an acceptable packet error probability for the feedback PMI/RI.

Overview of Channel State Information-Interference Measurement (CSI-IM)

[CSI-RS Resources]

For a serving cell and a UE set to TM 1 to TM 9, one CSI-RS resource configuration may be configured for the UE. For a serving cell and a UE set to TM 10, one or more CSI-RS resource configurations may be configured for the UE. The following parameters for which the UE should assume non-zero transmission power for a CSI-RS are configured for each CSI-RS resource configuration by higher-layer signaling.

CSI-RS resource configuration ID

The number of CSI-RS ports

CSI-RS subframe configuration $I_{CSI-RS}$

UE assumption for reference PDSCH transmitted power $P_c$ for a CSI feedback in each CSI process. If CSI subframe sets $C_{CSI,0}$ and $C_{CSI,1}$ are configured for a CSI process by higher layers, $P_c$ is configured for each CSI subframe set of the CSI process.

Pseudo-random sequence generation parameter, $n_{ID}$

UE assumption of quasi co-located (QCL) type B for CRS antenna ports and CSI-RS antenna ports, based on the following parameters.

Cell ID for QCL-assumed CRS

The number of CRS antenna ports for QCL-assumed CRS

MBSFN subframe configuration for QCL-assumed CRS

[Zero-Power CSI-RS Resources]

For a serving cell and a UE set to TM 1 to TM 9, if regarding the serving cell, csi-SubframePatternConfig-r12 is not configured for the UE, one zero-power CSI-RS (ZP CSI-RS) resource configuration may be configured for the UE. Herein, csi-SubframePatternConfig-r12 is a configuration related to a subframe subset for CSI measurement.

Further, for a serving cell and a UE set to TM 1 to TM 9, if regarding the service cell, csi-SubframePatternConfig-r12 is configured for the UE, up to two ZP CSI-RS resource configurations may be configured for the UE.

For a serving cell and a UE set to TM 10, one or more ZP CSI-RS resource configurations may be configured for the UE. The following parameters are configured for one or more ZP CSI-RS resource configurations by higher-layer signaling.

ZP CSI-RS configuration list (16-bit bitmap)

ZP CSI-RS subframe configuration $I_{CSI-RS}$

[CSI-IM (Interference Measurement)]

For CSI-IM, a part of ZP CSI-RS resources are used. The position of a CSI-IM resource corresponding to the part of the ZP CSI-RS resources is indicated to a UE, so that the UE may measure interference in the resource position.

In TM 10, one or more CSI processes may be configured per serving cell for the UE by a higher layer(s). Each CSI process is associated with CSI-RS resources and CSI-IM resources. CSI reported by the UE corresponds to a CSI process configured by the higher layer(s), and each CSI process may be configured along with or without a PMI/RI by higher-layer signaling.

The following parameters are configured in each CSI-IM resource configuration by higher-layer signaling.

ZP CSI-RS configuration

ZP CSI-RS subframe configuration $I_{CSI-RS}$

The UE does not receive a CSI-IM resource configuration(s) which is not fully overlapped with one ZP CSI-RS configuration configurable for the UE. Further, the UE does not receive a CSI-IM resource configuration which is not fully overlapped with one of ZP CSI-RS resource configurations.

When a plurality of analog and/or digital beams are defined and used for data transmission between an eNB having a plurality of antennas and a UE having a plurality of antennas, as is the case with full dimension-multiple input multiple output (FD-MIMO) and New radio access technology (RAT), the present disclosure proposes interference measurement and reporting methods for efficiently measuring interference between transmission and reception points (TRPs) (inter-TRP interference) caused by an increased number of beams and controlling the inter-TRP interference, and related operations.

The term BS used in the present disclosure may be applied to transmission and reception points such as a cell, an eNB, a sector, a transmission point (TP), a reception point (RP), a remote radio head (RRH), a relay, and so on. Further, the term is used comprehensively to distinguish component carriers (CCs) in a specific transmission and reception point. Particularly, as a BS, a point of performing a DL/UL transmission to a UE may be referred to as a transmission and reception point (TRP). The TRP may correspond to a specific physical cell, a group of plurality of physical cells, a specific analog beam, or a specific beam group. Hereinbelow, an antenna port refers to a virtual antenna element for which the same channel characteristics (e.g., delay profile, Doppler spread, and so on) may be assumed (within at least the same RB). Hereinbelow, a subframe (SF) refers to a repeated transmission unit having a predetermined time length. According to a numerology, an SF may be defined differently.

Now, a proposed method will be described based on a 3GPP LTE system, for the convenience of description. However, the proposed method may be extended to other systems (e.g., New RAT, UTRA, and so on) than the 3GPP LTE system.

Further, as described before, since a CSI-IM configuration includes information about resources for interference measurement, it will be obvious to those skilled in the art that "CSI-IM" refers to corresponding resources and/or all information related to the resources.

The current LTE 36.331 defines a CSI-IM configuration as follows.

CSI-IM-Config information elements

```
--ASN1START
CSI-IM-Config-r11 ::=SEQUENCE {
    csi-IM-ConfigId-r11 CSI-IM-ConfigId-r11,
    resourceConfig-r11 INTEGER (0..31),
    subframeConfig-r11 INTEGER (0..154),
    ...,
    [[interferenceMeasRestriction-r13 BOOLEAN OPTIONAL-Need ON
    ]]
}
CSI-IM-ConfigExt-r12::=SEQUENCE {
    csi-IM-ConfigId-v1250 CSI-IM-ConfigId-v1250,
    resourceConfig-r12 INTEGER (0..31),
    subframeConfig-r12 INTEGER (0..154),
    ...,
    [[interferenceMeasRestriction-r13 BOOLEAN OPTIONAL-Need ON
        csi-IM-ConfigId-v1310 CSI-IM-ConfigId-v1310
        OPTIONAL-Need ON
    ]]
}
--ASN1STOP
```

That is, csi-IM-Config includes csi-IM-ConfigId, resourceConfig indicating an RE pattern of IMRs in an RB, and subframeConfig indicating a transmission period and an offset. Particularly, the RE pattern is one of 4-port CSI-RS patterns. As one csi-IM-ConfigId is defined in a CSI process, the CSI process includes one CSI-IM.

Aperiodic CSI-IM may be classified into one-shot CSI IM and semi-persistent CSI-IM. The one-shot CSI IM is a scheme in which one-time CSI-IM measurement (e.g., in one subframe) is indicated by a CSI-IM measurement indication transmitted to a UE, whereas the semi-persistent CSI-IM is an aperiodic CSI-IM performed by periodically indicating CSI-IM measurement for a predetermined time to a UE by L1/L2 signaling such as enable/disable. The semi-persistent CSI-IM configuration may be similar to the above csi-IM-Config. However, in this case, only a transmission period may be set without an offset. If one resource is to be used commonly for one-shot CSI-IM and semi-persistent CSI-IM, a transmission period should be set per CSI-IM, or a period should be set for the whole CSI-IMs.

In an aperiodic CSI-IM configuration, especially a one-shot CSI-IM configuration, a transmission period and an offset are not defined, and in different aperiodic CSI-IMs (one-shot CSI-IMs), measurement results are not averaged (i.e., in the case of measurement restriction (MR) on, interference measurement results are not averaged across a subframe(s) or slot(s), whereas in the case of MR off, interference measurement results are averaged across a subframe(s) or slot(s)). For example, in FD-MIMO, subframeConfig among the above-described parameters is not configured, and the eNB indicates whether a CSI-IM is to be measured, and if it is to be measured, which CSI-IM is to be measured to the UE by later-described signaling. Likewise, a transmission period and an offset may not be configured in an aperiodic CSI-IM (one-shot CSI-IM) configuration in NR-MIMO.

In the present disclosure, a scenario in which a plurality of IM resources are configured for one CSI process is considered. The plurality of IM resources include the afore-described aperiodic CSI-IM, one-shot CSI-IM, and/or semi-persistent CSI-IM.

The term used herein, beam generically refers to analog/digital beam. The present disclosure is intended to provide a method of concentrating transmission power in a specific area by using weighted narrow beams, instead of an existing wide beam, through a plurality of antenna elements at an eNB and showing fewer antenna ports than actual antenna elements to a UE. This operation is similar to a Class B operation introduced to FD-MIMO, except that an analog/digital beam may be used instead of a digital beam of Class B in the former.

3.1. CSI-IM Configuration for Inter-TRP Beam Interference

Figure 5:
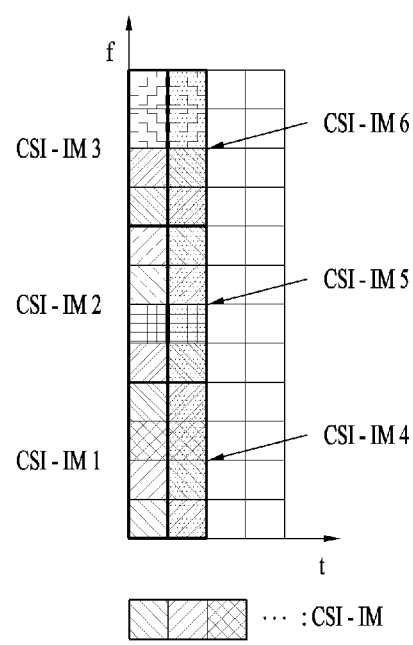
FIG. 5 illustrates channel state information-interference measurement (CSI-IM) resources.

A TRP configures a plurality of (N) CSI-IMs for a UE by higher-layer signaling. Particularly, the plurality of CSI-IMs may be configured in one CSI process. Each CSI-IM is a resource in which interference from one or more interference TRPs (TRPs causing interference to the UE), particularly interference from beams to be used by the interference TRPs is to be measured. The positions of the CSI-IMs are shared with the interference TRPs. An interference TRP transmits a plurality of beamformed non-zero power (NZP) CSI-RSs subjected to the same precoding as applied to beams used by the interference TRP, respectively in pre-shared CSI-IMS resources. The UE measures the strengths of interference channels for the beams used by the interference TRP in the corresponding resources. The transmission timing of NZP CSI-RSs and the measurement timing of the UE should be pre-agreed between TRPs. For example, a TRP may configure a total of 6 CSI-IMS for a UE, as illustrated in FIG. 5, and an interference TRP may transmit beamformed NZP CSI-RSs on beams with beam indexes 1 to 6 in the corresponding resources at a timing pre-agreed with the TRP. The interference TRP may transmit the NZP CSI-RSs on some beams, not a set of total beams. Particularly, this set of beams may be selected, for example, based on reference signal received power (RSRP) measured in beam reference signals (BRSs).

CSI-IM Configuration Method (Signaling)

To ensure more flexibility, a CSI-IM may be configured by L2 signaling and L3 signaling. For example, an eNB may configure $N_1$ CSI-IM resources for the UE by L3 signaling such as radio resource control (RRC) signaling, and configure $N_2$ CSI-IM resources to be actually used for the UE by L2 signaling such as medium access control (MAC) signaling.

Alternatively or additionally, the eNB may set the number of configured CSI-IMs to be larger than the number of CSI-IMs to be actually used, and indicate the set of CSI-IMs to be actually used to the UE by L1 signaling such as DCI. This case offers the largest flexibility, but giving rise to signaling overhead.

In any of the above cases, after one or more CSI-IM sets each including a plurality of CSI-IM resources are configured for a UE by higher-layer signaling, a CSI-IM set to be actually used may be indicated to the UE by DCI or the like.

CSI-IM Measurement Indication

A corresponding CSI-IM may be configured by a plurality of aperiodic CSI-IMs. In this case, the TRP may separately signal a measurement timing for the CSI-IM resource to the UE, and the UE may perform measurement in a subframe in which the CSI-IM resource has been configured. In the case where the TRP does not indicate a timing separately, if the UE is indicated to report interference in a corresponding method at the time of receiving an (aperiodic) CSI request, the UE may measure the CSI-IM in the afore-mentioned method at the time of receiving the CSI request.

A corresponding CSI-IM may be configured by a plurality of semi-persistent CSI-IMs. The TRP may indicate the start and end of measurement in the CSI-IM by separate enable/disable signaling based on DCI signaling, and the UE may measure interference power of the given CSI-IM for a predetermined time in every predetermined period. The measured values may be averaged for the given measurement, and compared with a measured value of another CSI-IM.

The above CSI-IM may reduce a frequency density 1. for interference measurement in many interference beam candidates, and 2. for reduction of CSI-IM overhead. For example, regarding interference measured at the same position in one RB, interference measured in an even-numbered RB and interference measured in an odd-numbered RB are from different beams, and may be distinguished by different CSI-IM IDs.

The TRP may indicate interference measurement in a CSI-IM configured for the UE by L1 signaling such as DCI. The L1 signaling may include an interference measurement timing, particularly enable/disable or equivalent signaling in the case of semi-persistent CSI-IM. When needed, the L1 signaling may indicate a CSI-IM resource (set), and include information about the above-described frequency density.

3.2. Interference Reporting to TRP

For each configured CSI-IM, the UE may report the index of a poorest beam, that is, the index of a beam having the highest interference power measurement to the TRP. The beam index may be the index of the configured CSI-IM. For example, if the interference power measurement of CSI-IM 3 is highest in FIG. 5, the UE may feed back 3 as an interference beam index. Hereinbelow, an IBI represents an interference beam index, for convenience. The TRP may indicate this reporting scheme to the UE by L1 signaling such as DCI. The indication may be included in a (aperiodic) CSI request, and may indicate reporting of a specific feedback type such as an IBI.

The UE may determine and report a plurality of IBIs. Herein, the UE may report upper K beam indexes corresponding to highest interference power measurements. K may be predefined or configured by higher-layer signaling. The "beam index corresponding to the highest interference power" may be regarded as a case in which K=1.

Alternatively or additionally, the UE may report the IBIs of all beams exceeding a predefined threshold. Then, a case in which interference which does not have the highest interference power but affects most UEs is not reported may be avoided. The threshold may be predefined or configured by higher-layer signaling.

Alternatively or additionally, the UE may report, as IBIs, K beam indexes corresponding to high interference power among beams exceeding a predefined threshold. If K=1, only one beam index corresponding to the highest interference power may be reported.

Alternatively or additionally, the UE may report an IBI based on interference power relative to required signal power. The required signal power is based on an additional CSI-RS measurement result. Particularly, the CSI-RS measurement result may be a value measured at a different timing from an interference measurement timing.

Figure 6:
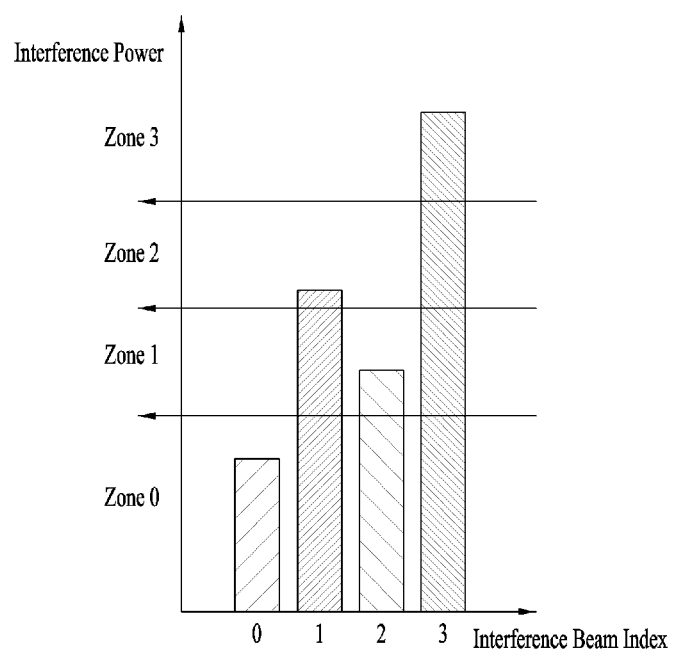
FIG. 6 illustrates measured interference power divided into level zones.

Instead of an IBI, the UE may report a simplified interference degree of each interference beam to the eNB. For example, interference beam power may be divided into level zones {0, 1, 2, 3}, and report to the eNB which one of the level zones {0, 1, 2, 3} measured interference power belongs to. In the illustrated case of FIG. 6, for example, {0, 2, 1, 3} may be reported as IBIs for beam indexes {0, 1, 2, 3}. Hereinbelow, a measurement result of an interference beam reported in this method is referred to as an "interference beam level (IBL)", for the convenience of description.

Particularly, the UE may transmit an IBI together with an IBL. The reported IBL may include only the IBL of a beam whose IBI is transmitted. IBIs and IBLs may be one to one matched according to their reporting orders. For the convenience of description, an IBI generically refers to both of IBI and IBL, particularly IBI and IBL report individually or IBI and IBL report together.

IBI Reporting Method

An IBI may be reported in an aperiodic CSI report. The UE transmits an IBI(s) in an indicated PUSCH resource.

An IBI may be transmitted in a periodic or semi-persistent CSI report. Particularly, if a semi-persistent CSI-IM and a semi-persistent CSI report are used together, an interference TRP may transmit a different interference beam in the same CSI-IM in each subframe, and the UE may then report an independent IBI to the eNB at each reporting timing, instead of averaging the measurement results of respective CSI-IMs over a semi-persistent CSI-IM transmission period. This may function to reduce a time-directional CSI-IM density, similarly to reduction of a frequency-direction CSI-IM density as described before. In this case, a reporting period may be set to be equal to a CSI-IM period.

Further, an IBI may be reported to the TRP on a frequency basis, that is, on an RB basis as well as on a subframe basis. That is, the interference TRP may transmit a different interference beam per predetermined number of RBs (e.g., per RB group) in each subframe, and the UE may measure the interference beams and report to the eNB an IBI for each interference beam or RB group at each reporting timing.

3.3. TRP Behavior for Inter-TRP Interference Control

The TRP collects IBIs reported by a plurality of UEs. The TRP may determine a "best interference beam list" listing N interference beams indicated by most IBIs among the reported IBIs, that is, N interference beams that cause most interference to the TRP, and indicate the beam list to interference TRPs using the corresponding beams. The N-beam list may be determined for all interference TRPs or each individual interference TRP. N may be a fixed value, or determined from total interference beams corresponding to IBIs equal to or larger than a predefined threshold.

If IBLs instead of/and IBIs are reported, the IBLs may be weighted in making the best interference beam list. That is, if IBLs {3, 2, 2, 0} and {2, 0, 1, 0} are reported for interference beams {0, 1, 2, 3}, the eNB may perform "interference beam scoring", for example, by scoring {5 2, 3, 0} for the interference beams {0, 1, 2, 3}, respectively. The weights may be defined separately for the indexes of actually reported IBLs (e.g., weights {0, 1, 2, 4} may be defined for IBLs {0, 1, 2, 3}).

The TRP may make the "best interference beam list" by the "interference beam scoring", or indicate the interference beam scores to the interference TRPs. Alternatively or additionally, the interference beam scores may be reported together with the best interference beam list to the interference TRPs. In this case, the interference beam scores are scores only for the interference beams listed in the best interference beam list.

The TRP may classify each beam into an interference category in the above manner. The interference category is a value representing how much the interference beam affects a UE of the TRP, and may be used for inter-TRP processing, as described later. For example, three interference categories may be defined, for example, according to the number of reported IBIs or "interference beams scores": interference category 0=slight interference; interference category 1=small interference; and interference category 2=severe interference, and the index of the interference category of each beam, instead of the "interference beam scores", may be indicated to an interference TRP.

A similar process may be used in the process of selecting a set of interference beams to be transmitted in actual CSI-IMs from among total interference beams, based on BRSs. Notably, IBIs/IBLs may be replaced with the RSRPs of beam indexes/beams selected based on BRS measurements.

If an IBI reported by different UEs represents different beams, for example, if IBI=3 reported by UE1 and UE2 represent interference of interference beam 3 from TRP 2 and TRP 3, the TRP should have prior knowledge of the relationship between IBIs of each UE and actual interference beams, and calculates interference of an actual beam from an IBI based on the knowledge. This implies that the TRP should have knowledge of TRPs that transmit interference beams in CSI-IMs configured for a UE.

Regarding the reported "best interference beam list", an interference TRP may process inter-TRP interference on a beam basis. For example, similarly to enhanced inter-cell interference coordination (eICIC), a plurality of subframe sets may be configured, and a data transmission on a beam listed in the "best interference beam list" may be performed only in a specific subframe set. In this case, a transmission on a beam that is not included in the best interference beam list may be performed irrespective of subframe sets. Likewise, this beam-based transmission and reception operation may be used in coordinated scheduling/beamforming (CS/CB) or dynamic point selection (DPS) in LTE. In this case, however, it may be understood that coordination is performed on a beam basis, not on a cell basis, particularly limited to the beams included in the best interference beam list.

Figure 7:
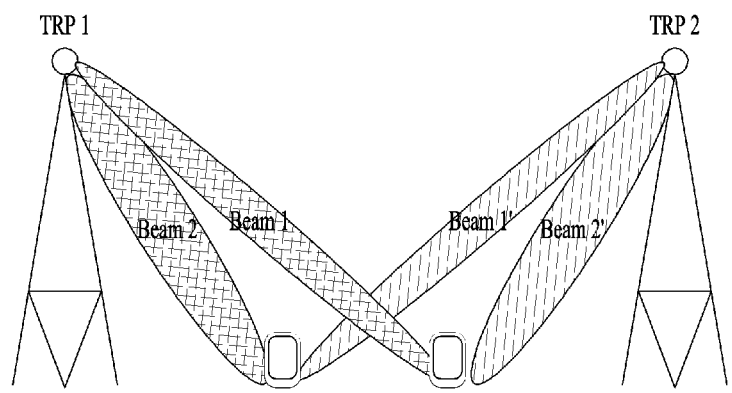
FIG. 7 illustrates inter-transmission and reception point (inter-TRP) beam interference.

If "interference beam scores" or "interference categories" are reported to the interference TRP, subframe sets used for eICIC may be configured at multiple levels. For example, two TRP operations may be considered as illustrated in FIG. 7.

Figure 8:
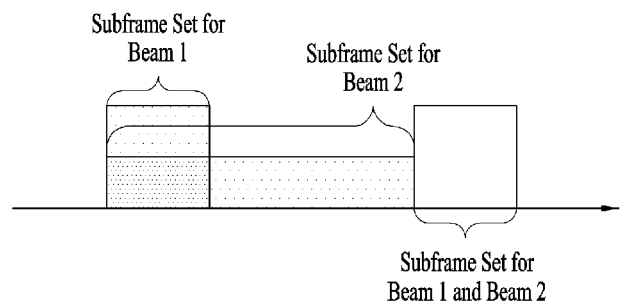
FIGS. 8 and 9 illustrate exemplary subframe set configurations for beam interference control.

That is, a situation may be considered, in which beam 1 of TRP 1 interferes with beam 1' and beam 2' of TRP 2 and beam 2 of TRP 1 interferes with beam 1' of TRP 2, and similarly, beam 1' of TRP 2 interferes with beam 1 and beam 2 of TRP 1 and beam 2' of TRP 2 interferes with beam 1 of TRP 1. In this case, subframe sets may be defined separately for beam 1 and beam 2, for inter-TRP ICIC, and the length of each subframe set may be determined in inverse proportion to a reported interference beam category or interference beam score. If scores {3, 1} are transmitted respectively for beam 1 and beam 2, the ratio between the numbers of subframes included in the subframe sets for beam 1 and beam 2 may be 1:3. The subframe sets may overlap with each other. That is, subframe sets may be configured as illustrated in FIG. 8.

Figure 9:
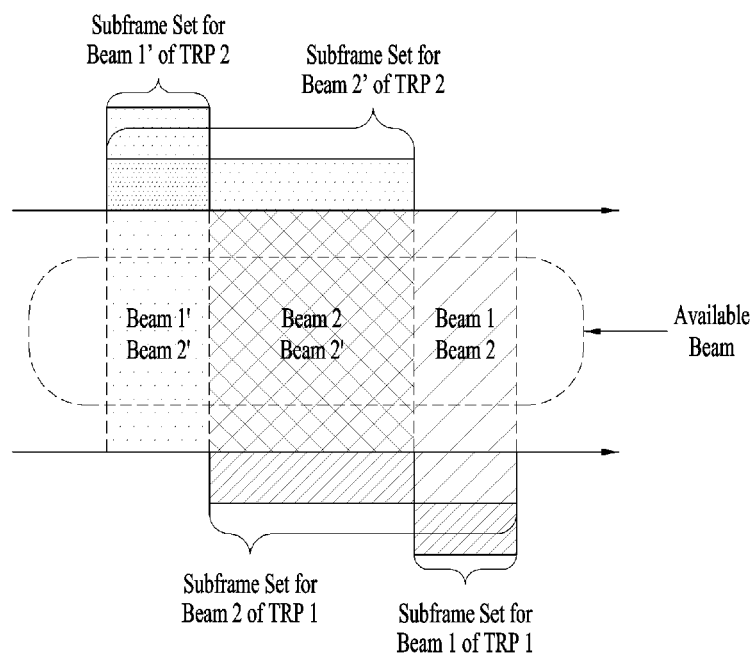

In this case, each score means the number of UEs that are affected by a corresponding beam. Regarding a data transmission time of a UE which is to avoid interference from the beam, as much time as the reported score for the beam is required probabilistically (particularly, when a similar amount of data is transmitted to each UE). For this purpose, beam 1 and beam 2 are preferably configured such that they are used for times inversely proportional to the reported scores, avoiding the transmission times of each beam at the UEs. That is, in the corresponding example, the TRP may schedule a UE that wants to avoid interference from beam 1 of the interference TRP in a subframe set for beam 2, and a UE that wants to avoid interference from beam 1 in a subframe set for beam 1. In this case, adjacent TRPs, TRP 1 and TRP 2 may be configured to use beams in the manner illustrated in FIG. 9.

Although the above description is based on the assumption that each subframe set includes one of beam 1 and beam 2, the above subframe set may be defined for a set of a plurality of beams. Further, the size of an actual subframe set may further be adjusted in consideration of a parameter other than those in the above method, for example, the amount of supported traffic for each beam.

Further, an available beam may be defined per RB or RB group as well as per subframe set as described above. For this purpose, apart from use of different beams in different subframes as described before, different beams may be used for different RB groups in a specific subframe, and a UE may measure the beams. Further, each TRP or TRPs may cooperatively share interference measurement results received from (or reported by) UEs, and derive or define a frequency resource-wise available beam list, for example, an available beam list per RB group.

A measurement restriction (MR) may be imposed on an IMR. In the legacy MR considered for LTE, it is configured whether measurement results may be averaged in a time-wise manner. Frequency-wise extension of the legacy MR is under discussion in new RAT. Therefore, this may be extended to a method of configuring the size and position of a resource group in which measurement values may be considered to be equal. The UE may consider a frequency resource unit in which interference measurements may be averaged based on a corresponding parameter.

In interference measurement, an interference signal introduced to a corresponding IMR may be actual data in some cases. Accordingly, the interference is preferably produced in units of a resource unit to which the same precoding is applied. In legacy LTE, when interference from an adjacent cell is measured, the size of a unit to which different precoding is applied, that is, the size of a precoding resource block (PRG) may be known from the system bandwidth of a corresponding cell. However, since a PRB bundling size for precoding may be configured in new RAT, a PRB bundling size used in an adjacent cell may not be determined implicitly. Accordingly, the size of a frequency measurement restriction (F-MR) resource for an IMR may be indicated to a UE in new RAT. The UE may measure more accurate interference by averaging interference measurements in indicated F-MR resources. In other words, the UE does not perform such an operation as averaging, assuming that IMRs included in different F-MR resources have different measurements. This method may be more useful in increasing the accuracy of interference measurement in such a case as aperiodic IMR for which time-wise averaging is difficult.

Further, an accurate F-MR resource size may be provided to the UE. In this case, a range of configurable values may vary according to the characteristics of an interference cell, for example, a resource group size of the interference cell. This is because for the PRB bundling size of the interference cell to be reflected in the afore-described F-MR resources, a range of values which can be configured/signaled may be determined according to a resource group size used in the interference cell. An RBG, a subband, a wideband, or a system bandwidth size may be considered as the resource group. Particularly, it is preferred to configure a value of the interference cell as a resource group size. For this purpose, the resource group value (e.g., wideband/subband/system bandwidth/RBG size) of the interference cell may be indicated.

Alternatively or additionally, the F-MR resource size may be indicated based on a predetermined resource group size. For example, it may be defined that F-MR resource size=RBG size/k, and k may be configured for the UE.

The F-MR resource size may be indicated to the UE by RRC signaling or MAC signaling. Particularly in the case where the F-MR resource size is indicated by MAC signaling, the F-MR resource size may be selected from among F-MR resource sizes predefined by RRC signaling and configured for the UE by MAC signaling. In the case where the F-MR resource size is indicated by RRC signaling, a corresponding parameter is an IMR configuration or measurement configuration unit, and thus different F-MR resource sizes may be configured.

The F-MR resource size may be indicated to the UE by dynamic signaling through DCI. The F-MR resource size may be included in an aperiodic IMR indication, and a set of values that may be indicated by DCI may be defined by RRC signaling or MAC signaling, for DCI overhead reduction.

In a method for F-MR resource signaling to a UE by DCI, F-MR resource size information may be included as the contents of a state of an aperiodic CSI trigger configured by RRC signaling. For example, the information may be configured in addition to a measurement configuration (i.e., a set of channel measurement resource(s), interference measurement resource(s), and reporting configuration(s)) for aperiodic CSI triggering In the case of a wideband IMR, the same F-MR resource is not defined across different partial bands. In other words, if F-MR resources are configured as the same according to an F-MR resource parameter but exist across a plurality of partial bands, the UE considers the corresponding two F-MR resource parts to be different F-MR resources. Such partial bands may be configured as different partial bands, if services and/or the numerologies (e.g., symbol periods and subcarrier sizes) of the bands are different. These partial bands of the interference cell may be configured for the UE. Particularly, this information may be configured separately from an IMT configuration or an F-MR configuration, and thus an F-MR resource may be defined according to the information.

F-MR resource signaling may be transmitted along with frequency MR signaling to the UE. In other words, an F-MR resource size as well as F-MR on/off may be indicated to the UE.

1 RB unit (MR on)/configured F-MR resource #1 unit/configured F-MR resource #2 unit/wideband unit (MR off)

In the above example, F-MR resource #1/F-MR resource #2 may be configured for the UE by higher-layer signaling such as RRC signaling/MAC signaling. Particularly, when one F-MR resource size is defined in the foregoing method, the F-MR resource size and F-MR on/off may be signaled as 1 RB unit (MR on)/F-MR resource unit (MR off) to the UE.

If an offset between the PRB bundles (PRGs or resource groups in which PRB bundles are defined) of two cells, that is, different PRB bundle positions for the two cells are defined, the eNB may configure the offset and an F-MR resource size for the UE. Alternatively or additionally, since the offset may not change over time for the eNB, the offset may be configured independently of the F-MR resource size. In this case, the offset may be configured by higher-layer signaling such as RRC signaling.

If precoding is maintained for a predetermined time period, for example, n subframes in a time direction due to the use of time-wise precoder cycling, the foregoing method may also be used in a similar manner on the time axis.

Figure 10:
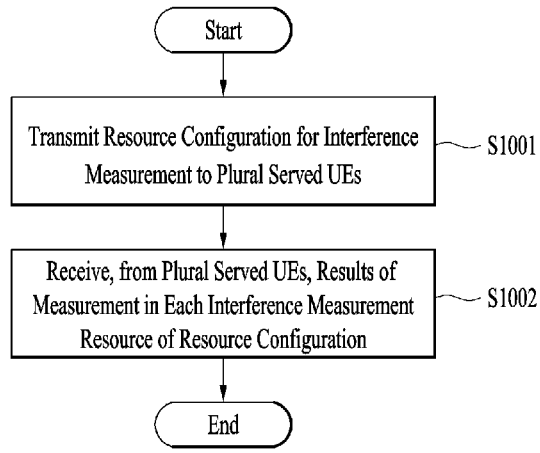
FIG. 10 illustrates an operation of a user equipment (UE) according to an embodiment of the present disclosure.
Figure 10:
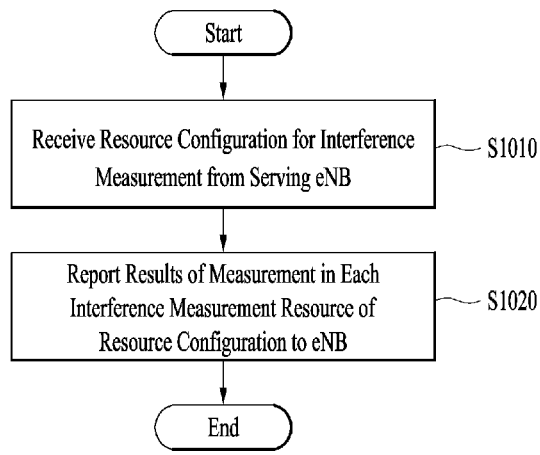

FIG. 10 illustrates operations according to an embodiment of the present disclosure.

(a) of FIG. 10 is a flowchart illustrating an interference measurement method in a wireless communication system, performed by an eNB.

The eNB may transmit a resource configuration for interference measurement to a plurality of served UEs (S1001). The resource configuration may be shared with a neighbor interference eNB, and a predetermined beam may be used in each interference measurement resource included in the resource configuration.

The eNB may receive results of measurement in each interference measurement resource of the resource configuration from the plurality of served UEs (S1002). The measurement results may include the indexes of N beams in which highest interference power has been measured or the indexes of N interference measurement resources in which the highest interference power has been measured. N is an integer equal to or larger than 1.

The eNB may additionally derive an interference beam list that causes most interference to the plurality of served UEs from the received measurement results. Then the eNB may transmit the interference beam list to the neighbor interference eNB.

To derive the interference beam list, the eNB may use a weight for each beam or each interference measurement resource.

Beams listed in the interference beam list may be used for DL transmission only in a specific subframe set at the neighbor interference eNB.

The length of the specific subframe set may be set in inverse proportion to relative magnitudes of the interference measurement results of the beams listed in the interference beam list.

The eNB may further receive, from the neighbor interference eNB, a neighbor interference beam list derived from measurement results of served UEs of the neighbor interference eNB.

The resource configuration may indicate use of a different beam in each subframe in a specific interference measurement resource included in the resource configuration.

Further, the resource configuration may indicate use of a different beam in each RB in a specific interference measurement resource included in the resource configuration.

Further, the measurement results may include the index of a beam in which interference power exceeding a predetermined threshold has been measured, or the index of an interference measurement resource in which interference power exceeding the predetermined threshold has been measured.

Further, the resource configuration may indicate semi-persistent interference measurement, and activation and deactivation of the resource configuration are indicated by dynamic signaling.

The interference measurement results may not be averaged in a semi-persistent interference measurement period.

(b) of FIG. 10 is a flowchart illustrating an interference measurement method in a wireless communication system, performed by a UE.

The UE may receive a resource configuration for interference measurement from a serving eNB (S1010). The resource configuration may be shared with a neighbor interference eNB, and a predetermined beam may be used in each interference measurement resource included in the resource configuration. The UE may measure interference in each interference measurement resource of the resource configuration and report the measurement result to the serving eNB (S1020).

The measurement results may include the indexes of N beams in which highest interference power has been measured or the indexes of N interference measurement resources in which the highest interference power has been measured. N is an integer equal to or larger than 1.

While the embodiments of the present disclosure have been described briefly with reference to FIG. 10, the embodiment related to FIG. 10 may include at least a part of the foregoing embodiments(s) alternatively or additionally.

Figure 11:
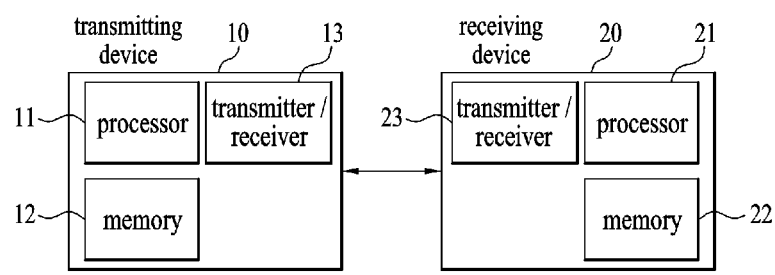
FIG. 11 is a block diagram of apparatuses for implementing the embodiment(s) of the present disclosure.

FIG. 11 is a block diagram of a transmitting device 10 and a receiving device 20 configured to implement exemplary embodiments of the present disclosure. Referring to FIG. 11, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

In embodiments of the present disclosure, the UE or the terminal operates as the transmitting device 10 on uplink, and operates as the receiving device 20 on downlink. In embodiments of the present disclosure, the eNB or the base station operates as the receiving device 20 on uplink, and operates as the transmitting device 10 on downlink.

The transmitting device and/or the receiving device may be configured as a combination of one or more embodiments of the present disclosure.

Detailed descriptions of preferred embodiments of the present disclosure have been given to allow those skilled in the art to implement and practice the present disclosure. Although descriptions have been given of the preferred embodiments of the present disclosure, it will be apparent to those skilled in the art that various modifications and variations can be made in the present disclosure defined in the appended claims. Thus, the present disclosure is not intended to be limited to the embodiments described herein, but is intended to have the widest scope consistent with the principles and novel features disclosed herein.

INDUSTRIAL APPLICABILITY

The present disclosure can be used for such a wireless communication device as a terminal, a relay, a base station, and the like.

The invention claimed is:

1. A method for interference measurement in a wireless communication system, performed by a base station (BS), the method comprising:
    transmitting, to a plurality of user equipments (UEs), a resource configuration for interference measurement, acquired from a neighbor interference BS, the resource configuration including information regarding a predetermined beam used in each interference measurement resource;
    receiving, from the plurality of UEs, results of measurement in each interference measurement resource of the resource configuration;
    deriving, from the received measurement results, an interference beam list causing most interference to the plurality of UEs; and
    transmitting, to the neighbor interference BS, the interference beam list,
    wherein a beam included in the interference beam list is used, by the neighbor interference BS, for downlink transmission only in a specific subframe set, and
    wherein a length of the specific subframe set is set in inverse proportion to a relative magnitude of an interference measurement result of the beam included in the interference beam list.

2. The method according to claim 1, wherein the measurement results include indexes of N beams in which highest interference power has been measured or indexes of N interference measurement resources in which the highest interference power has been measured, and N is an integer equal to or greater than 1.

3. The method according to claim 1, wherein a weight is used for each beam or each interference measurement resource to derive the interference beam list.

4. The method according to claim 1, further comprising receiving, from the neighbor interference BS, a neighbor interference beam list derived according to measurement results of UEs served by the neighbor interference BS.

5. The method according to claim 1, wherein the resource configuration indicates use of a different beam on a subframe basis in a specific interference measurement resource included in the resource configuration.

6. The method according to claim 1, wherein the resource configuration indicates use of a different beam on a resource block basis in a specific interference measurement resource included in the resource configuration.

7. The method according to claim 1, wherein the measurement results include an index of a beam in which interference power higher than a predetermined threshold has been measured, or an index of an interference measurement resource in which interference power higher than the predetermined threshold has been measured.

8. The method according to claim 1, wherein the resource configuration indicates semi-persistent interference measurement, and activation and deactivation of the resource configuration are indicated by dynamic signaling.

9. The method according to claim 8, wherein interference measurement results are not averaged in a period for the semi-persistent interference measurement.

10. A method for interference measurement in a wireless communication system, performed by a user equipment (UE), the method comprising:
    receiving, from a serving base station (BS), a resource configuration for interference measurement, acquired from a neighbor interference BS, the resource configuration including information regarding a predetermined beam used in each interference measurement resource; and
    measuring interference in each interference measurement resource of the resource configuration, and reporting measurement results to the serving BS,
    wherein the resource configuration indicates semi-persistent interference measurement, and
    wherein activation and deactivation of the resource configuration are indicated by dynamic signaling.

11. The method according to claim 10, wherein the resource configuration indicates use of a different beam on a subframe basis in a specific interference measurement resource included in the resource configuration.

12. The method according to claim 10, wherein the resource configuration indicates use of a different beam on a resource block basis in a specific interference measurement resource included in the resource configuration.

13. The method according to claim 10, wherein the measurement results include an index of a beam in which interference power higher than a predetermined threshold has been measured, or an index of an interference measurement resource in which interference power higher than the predetermined threshold has been measured.

14. The method according to claim 10, wherein the measurement results include indexes of N beams in which highest interference power has been measured or indexes of N interference measurement resources in which the highest interference power has been measured, and N is an integer equal to or greater than 1.

15. The method according to claim 10, wherein interference measurement results are not averaged in a period for the semi-persistent interference measurement.

16. A base station (BS) configured to perform interference measurement in a wireless communication system, the BS comprising:

a transmitter and receiver; and a processor configured to control the transmitter and receiver, wherein the processor is further configured to:

transmit, to a plurality of user equipments (UEs), a resource configuration for interference measurement, acquired from a neighbor interference BS, the resource configuration including information regarding a predetermined beam used in each interference measurement resource, receive, from the plurality of UEs, results of measurement in each interference measurement resource of the resource configuration, derive, from the received measurement results, an interference beam list causing most interference to the plurality of UEs, and transmit, to the neighbor interference BS, the interference beam list, wherein a beam included in the interference beam list is used, by the neighbor interference BS, for downlink transmission only in a specific subframe set, wherein a length of the specific subframe set is set in inverse proportion to a relative magnitude of an interference measurement result of the beam included in the interference beam list.

* * * * *